(12) United States Patent
Müller et al.

(10) Patent No.: US 8,561,313 B2
(45) Date of Patent: Oct. 22, 2013

(54) APPARATUS FOR MEASURING FILM BUBBLES

(75) Inventors: Frank Müller, Wuppertal (DE); Markus Stein, Gevelsberg (DE); Stefan Konermann, Remscheid (DE)

(73) Assignee: Plast-Control GmbH, Remscheid (DE)

( * ) Notice: Subject to any disclaimer, the term of this patent is extended or adjusted under 35 U.S.C. 154(b) by 286 days.

(21) Appl. No.: 13/095,177

(22) Filed: Apr. 27, 2011

(65) Prior Publication Data

US 2011/0265556 A1   Nov. 3, 2011

(30) Foreign Application Priority Data

Apr. 29, 2010   (EP) ..................................... 10161537

(51) Int. Cl.
*G01D 21/00* (2006.01)
(52) U.S. Cl.
USPC .......................................... 33/645; 73/865.8
(58) Field of Classification Search
USPC ................. 33/533, 553, 645; 73/865.5, 865.8
See application file for complete search history.

(56) References Cited

U.S. PATENT DOCUMENTS 6,536,128 B2 *  3/2003  Glanzmann ...................... 33/553
7,299,563 B2 * 11/2007  Glanzmann ...................... 33/645

FOREIGN PATENT DOCUMENTS

| DE | 4126337 A1 | 2/1993 |
| DE | 19632385 A1 | 3/1997 |
| EP | 1116931 A1 | 7/2001 |
| EP | 1191305 B1 | 3/2002 |
| EP | 1674821 A1 | 6/2006 |
| WO | 2009/027037 A1 | 3/2009 |

OTHER PUBLICATIONS

Machine Translation, Sebastian et al., DE 4126337, Workpiece measuring station esp. for quality control—contains linkage between straight adjustment rail and distance sensor, positioning motors and computer, Feb. 11, 1993, Translated Mar. 2013.*

* cited by examiner

*Primary Examiner* — Hezron E Williams
*Assistant Examiner* — David Z Huang
(74) *Attorney, Agent, or Firm* — Richard M. Goldberg

(57) ABSTRACT

An apparatus for measuring film bubbles (10), includes a guide track (22) that extends in a circumferential direction of the film bubble with a constant spacing relative to the latter, the guide track guiding a carriage (20) which carries a measuring head (12) facing the peripheral surface of the film bubble (10), the measuring head (12) is connected to a free end of a cantilever (18) via an articulated joint (16), the cantilever having another end pivotally connected to the carriage (20), and a compensating drive mechanism (30) for correcting a change in the orientation of the measuring head (12) resulting from a pivotal movement of the cantilever (18) is associated with the articulated joint (16).

6 Claims, 2 Drawing Sheets

APPARATUS FOR MEASURING FILM BUBBLES

BACKGROUND OF THE INVENTION

The invention relates to an apparatus for measuring film bubbles, comprising a guide track that extends in circumferential direction of the film bubble with a constant spacing relative to the latter, said guide track guiding a carriage which carries a measuring head facing the peripheral surface of the film bubble.

In the art of film blowing, it is desirable to perform measurements on the film bubble during the production process. In particular, it is desired to continuously monitor the thickness distribution of the film over the periphery of the film bubble, so that the cooling and/or extrusion temperature may be feedback-controlled for obtaining a constant thickness profile. In this case, the measuring head may for example be a capacitive thickness gauge, that hovers on an air cushion over the outer peripheral surface of the film bubble as has been described in WO 2009/027037.

EP 1 674 821 A1 describes a measuring device of the type indicated above wherein two carriages are guided on the guide track, and these carriages are connected to one another by a beam. The measuring head is mounted in the center of the beam. The beam consists of two parts that are pivotally or telescopically connected to one another, so that the distance between the two carriages on the guide track may be varied and, consequently, the radial position of the measuring head may be adapted to the actual diameter of the film bubble, while the measuring head stays facing the peripheral surface of the film bubble.

SUMMARY OF INVENTION

It is an object of the invention to provide a measuring device of this type which has a simpler construction.

According to the invention, this object is achieved by the features that the measuring head is connected, via an articulated joint, to a free end of a cantilever the other end of which is pivotally connected to the carriage, and that a compensating drive mechanism correcting a change of the orientation of the measuring head resulting from the pivotal movement of the cantilever is associated with the articulated joint.

According to the invention, only a single carriage per measuring head needs to be mounted on the guide track. For adapting the position of the measuring head to different diameters of the film bubble, the cantilever is pivoted relative to the carriage. However, this pivotal movement is also accompanied by a change in the orientation of the measuring head relative to the peripheral surface of the film bubble. This change is reversed by the compensating drive mechanism, so that the measuring head will always be oriented in parallel with the peripheral surface of the film bubble at the position where it measures the film.

Advantageous details of the invention are indicated in the dependent claims.

Depending upon the embodiment, the cantilever may be pivotable in a horizontal plane, i.e. in parallel with the plane of the guide track, or in a vertical plane, i.e. normal to the plane of the guide track. In the former case, a pivotal movement of the cantilever will in general also result in a change of the azimuth of the measuring position where the measuring head measures the film. In order to be able to measure and record the thickness profile over the periphery of the film bubble, it is necessary to know the azimuth of the measuring position for each instant when a measurement is made. When the cantilever is pivoted in order to adapt the apparatus to a different diameter of the film bubble, calculations are performed for correcting the resulting change in the azimuth.

The compensating drive mechanism may be an active drive mechanism, e.g. in the form of a suitably controlled servo motor. However, it is also possible to provide a passive drive mechanism which is formed by coupling the pivotal movement of the measuring head about the pivotal axis of the articulated joint to the pivotal movement of the cantilever relative to the carriage. The coupling may for example be achieved by means of an articulated control linkage assembly or by a belt and pulley arrangement.

BRIEF DESCRIPTION OF THE DRAWINGS

An embodiment example will now be described in conjunction with the drawings, wherein.

DETAILED DESCRIPTION

Figure 1:
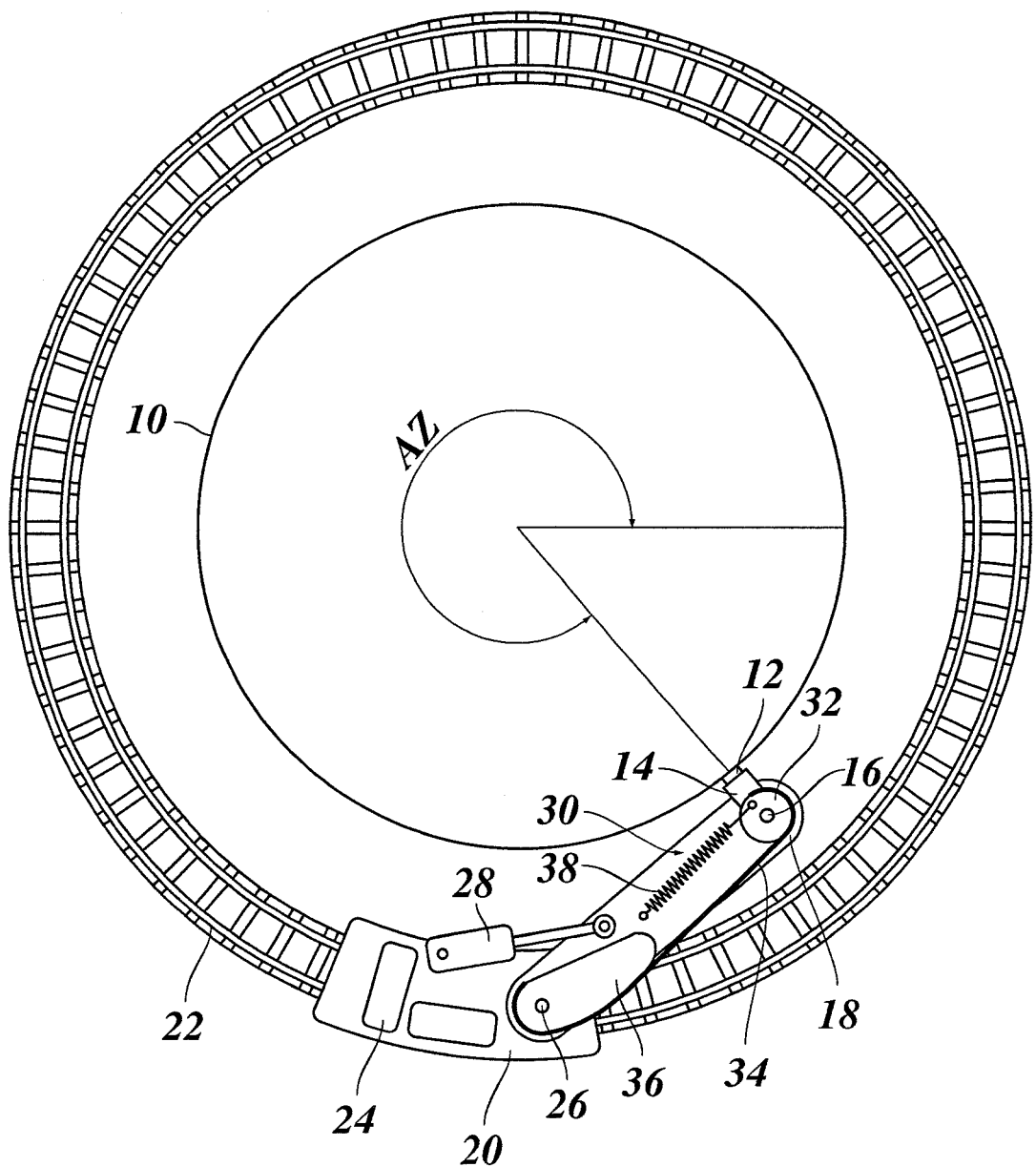
FIG. 1 shows a schematic plan view of a measuring apparatus according to the invention.

The apparatus shown in FIG. 1 serves for performing measurements on a tube-like film bubble 10 which has been shown in horizontal cross-section in FIG. 1. As is known in the art of film blowing, a film tube is extruded from an annular nozzle and is inflated with internal air so as to form the film bubble 10 which will then be drawn-off upwardly, flattened, and wound on a coil. In the zone where the diameter of the film bubble increases as a result of internal air being blown in, the film bubble is usually cooled by blowing air against the film bubble from outside, until the plastic material loses its plasticity at the so-called freeze limit, whereafter it can no longer be stretched. The peripheral areas of the film bubble 10 which are cooled less intensely remain at higher temperature and, hence, are easier to be stretched, so that the film is thinned here to a larger extent, whereas a thickened region is formed in the film in peripheral areas where the cooling is more intense. Thus, non-uniform cooling conditions can lead to an uneven thickness profile of the film. The measuring apparatus that has been shown here has the main purpose to continuously monitor the thickness profile of the film above the freeze limit on the entire periphery of the film bubble 10, so that the cooling conditions can be controlled in a closed feedback loop.

To that end, the periphery of the film bubble 10 is engaged by a measuring head 12, e.g. a capacitive measuring head which slides over the film surface on an air cushion. The measuring head 12 is mounted at an end of a holder 14 which itself is pivotally mounted to the free end of a cantilever 18 via a joint 16.

The other end of the cantilever 18 is attached to a carriage 20 that is guided on a guide track 22. In the example shown the guide track 22 is annular and surrounds the entire periphery of the film bubble 10. The carriage 20 can be moved along the guide track 22 by means of locomotive drive 24, so that the measuring head 12 may revolve around the periphery of the film bubble 10.

In order for the position of the measuring head 12 to be adaptable to varying diameters of the film bubble 10, the cantilever 18 is pivotable about a vertical axis 26 (in parallel with the axis of the film bubble 10) relative to the carriage 20. To that end, in the example shown, a pivotal drive 28 has been provided which may be configured as a spindle drive or, optionally, a hydraulic or pneumatic piston/cylinder unit.

When, however, the cantilever 18 is rotated by a certain angle about the axis 26 in order to adjust the measuring head 12 to a different diameter of the film bubble, the orientation of the measuring head 12 will change accordingly. If no countermeasures were taken, the measuring surface of the measuring head 12 facing the film surface would no longer be oriented parallel to the film surface, and a correct measurement would not be possible. For this reason, the joint 16 is associated with a compensating drive mechanism 30 which automatically corrects the orientation of the measuring head 12.

When, as in the condition shown in FIG. 1, the cantilever 18 does not extend exactly tangential to the guide track 22, and then the cantilever is pivoted about the axis 26, the movement of the joint 16 at the free end of the cantilever has also a component in circumferential direction of the guide track 22, and this has the consequence that the azimuth AZ of the measuring position is changed although the position of the carriage 20 remains unchanged. This change of the measuring position must be taken into account when the measurement results provided by the measuring head 12 are recorded, so that the film thickness may correctly be associated with the respective segments of the periphery of the film bubble.

Moreover, the change of the azimuth AZ has also the consequence that the peripheral surface of the film bubble 10 at the position of the measuring head 12 has a different orientation. This is why, in general, the compensating drive mechanism 30 must not only turn back the holder 14 by the angle about which the cantilever 18 has been rotated relative to the carriage 20, but must also compensate for the change in the orientation of the surface of the film bubble that has been caused by the change in azimuth.

In the example shown, the compensating drive mechanism 30 is a passive drive mechanism which does not have a motor but mechanically couples the pivotal movement of the cantilever 18 relative to the carriage 20 to a rotation of the holder 16 about the joint 16. To that end, a pulley 32 is mounted on the holder 14, and a belt 34 runs over the periphery of the pulley. One end of the belt 34 is fixed at the pulley 32. The other end is fixed at a cam disk 36 and passes over a control contour that is formed by this cam disk 36. The cam disk 36 is non-rotatably connected to the carriage 20.

A tension spring 38 is excentrically attached to the pulley 32 for holding the belt 34 under tension. When, now, the cantilever 18 is rotated about the axis 26 relative to the carriage 20, the belt 34 is either wound-up or rolled-off from the control contour of the cam disk 36 so that its length is either increased or reduced, with the result that the pulley 32 and the holder 14 and the measuring head 12 are rotated accordingly about the joint 16. The contour of the cam disk 36 has been designed such that this rotation compensates not only the rotation of the cantilever about the axis 26 but also the change in azimuth, so that the measuring surface of the measuring head 12 will again be oriented exactly in parallel with the peripheral surface of the film bubble 10.

Figure 2:
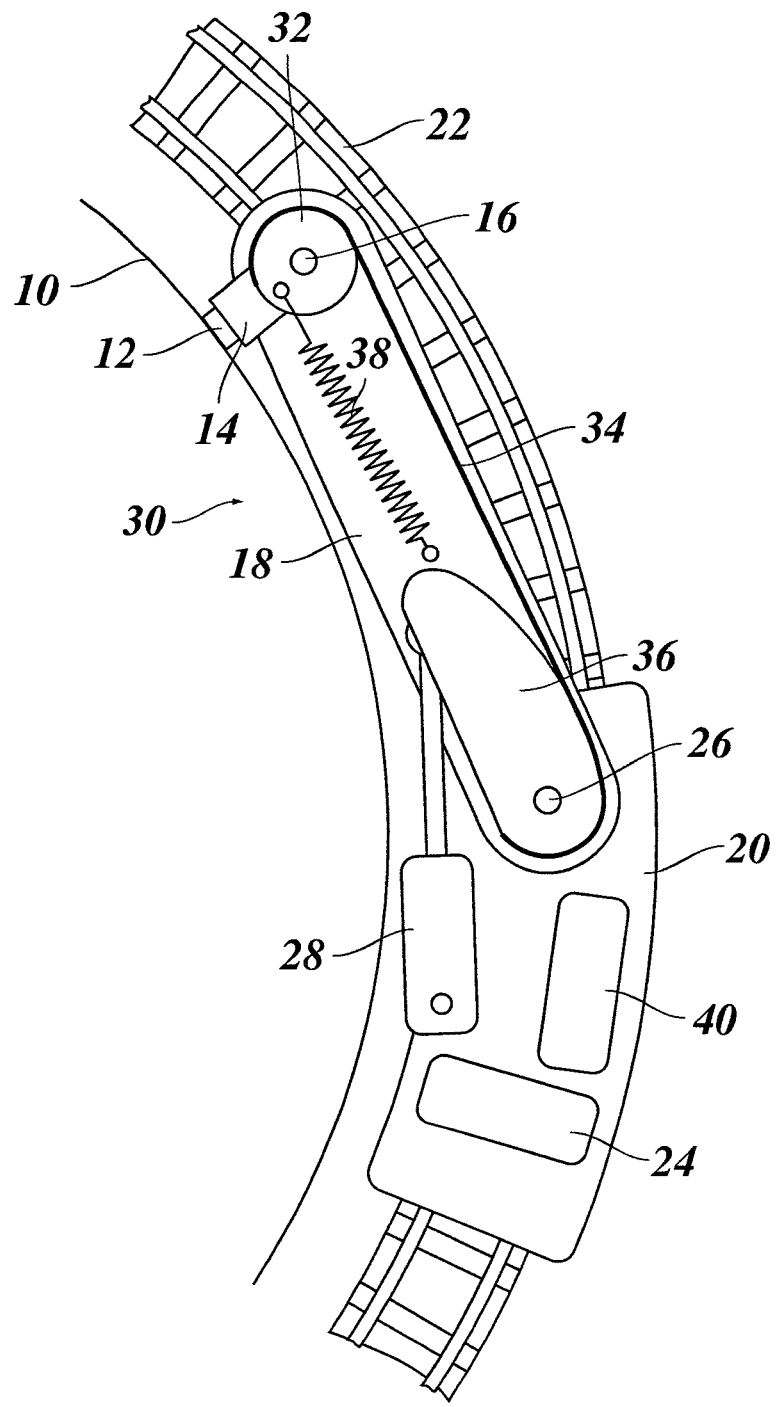
FIG. 2 shows an enlarged plan view of essential parts of the measuring apparatus in a different operating state.

FIG. 2 illustrates a condition where the film bubble 10 has a larger diameter and, consequently, has a smaller spacing from the guide track 22. Consequently, the cantilever 18 has been rotated outwardly. As a result, the belt 34 has been rolled-off from the control contour of the cam disk 36, and the effective length of the belt 34 has increased. This increasing length has permitted a contraction of the tension spring 38, so that the pulley 32 has been rotated about an angle that is determined by the geometry of the cam disk 36. The amount of this angle is such that, in the new position, the measuring head 12 engages the surface of the film bubble 10 again in exact parallelism with this surface.

Mounted on the carriage 20 is an electronic control unit 40 which controls the locomotive drive 24, the pivotal drive 28 for the cantilever 18, as well as the operation of the measuring head 12, and receives and records the measurement results. The control unit 40 also processes a displacement signal that is delivered by the locomotive drive 24 and indicates the position of the carriage 20 on the guide track 22, as well as an angular increment signal provided by an angular position sensor (not shown) at the cantilever 18 and indicating the angular position of the cantilever 18 relative to the carriage 20. In a preferred embodiment, a displacement sensor is integrated in the pivotal drive 28 (spindle drive) for measuring the (linear) displacement of the spindle drive, and the angular increment signal is calculated from the signal of this displacement sensor. Based on these data, the control unit 40 calculates the azimuth position of the measuring head 12, so that the results of the thickness measurement can correctly be associated with the pertinent circumferential position on the film bubble 10.

When the measuring apparatus is converted and adapted to a different film bubble diameter, the cantilever 18 may optionally be pivoted manually. Thus, the pivotal drive 28 is not mandatory.

On the other hand, when a controllable pivotal drive 28 is present, the control unit 14 can control the pivotal movement of the cantilever 18 as a function of the actual shape and size of the film bubble 10. To that end, the measuring head 12 may have an integrated force sensor which measures the force with which the film bubble presses against the measuring head. An example has been described in EP 1 191 305 B1. When the control unit 40 feedback-controls this force to a given target value, the measuring head will automatically adapt to the actual position of the film bubble. As an alternative, the position of the measuring head relative to the film bubble may also be detected and controlled by means of a distance sensor, e.g. an ultrasonic distance sensor.

The invention claimed is:

1. An apparatus for measuring a thickness of a film bubble, comprising:
   an annular guide track that extends in a circumferential direction of the film bubble with a constant spacing relative to the film bubble,
   a single carriage guided on the guide track,
   a thickness measuring head carried on the carriage and facing a peripheral surface of the film bubble,
   a cantilever having one end pivotally connected to the carriage, the measuring head being connected to a free end of the cantilever via an articulated joint,
   a compensating drive mechanism for correcting a change in the orientation of the measuring head resulting from a pivotal movement of the cantilever that is associated with said articulated joint,
   wherein the cantilever is pivotable in a plane that extends in parallel with a plane of the guide track, and
   a control unit adapted to determine an azimuthal position of the measuring head relative to a central axis of the film bubble on the basis of an azimuthal position of the carriage on the guide track and the angular position of the cantilever relative to the carriage, said control unit being further adapted to assign measurement results provided by said measuring head to said azimuthal positions.

2. The apparatus according to claim 1, wherein the compensating drive mechanism includes a coupling mechanism for mechanically coupling the pivotal movement of the cantilever relative to the carriage to a rotation of the measuring head about said articulated joint.

3. The apparatus according to claim 2, wherein said compensating drive mechanism comprises a pulley and a belt guided over said pulley.

4. The apparatus according to claim 3, wherein said compensating drive mechanism comprises a cam disk forming a control contour from which said belt rolls off.

5. The apparatus according to claim 4, wherein the cam disk is fixedly mounted on the carriage.

6. The apparatus according to claim 3, wherein the pulley is elastically biased in an angular direction for holding the belt under tension.

\* \* \* \* \*